United States Patent [19]
Rebish

[11] 3,773,299
[45] Nov. 20, 1973

[54] FOUNDRY MIXING MACHINE
[75] Inventor: Edward J. Rebish, Cleveland, Ohio
[73] Assignee: Acme-Cleveland Corporation, Cleveland, Ohio
[22] Filed: Dec. 27, 1971
[21] Appl. No.: 211,925

[52] U.S. Cl. .................. 259/4, 259/161, 259/168
[51] Int. Cl. .............................................. B01f 5/24
[58] Field of Search ................. 259/2, 36, 150, 180, 259/168, 7, 8, 164, 165, 161, 18, 21, 22, 4

[56] References Cited
UNITED STATES PATENTS

| | | | |
|---|---|---|---|
| 2,953,359 | 9/1960 | Mau | 259/180 |
| 3,158,358 | 11/1964 | Fischer | 259/8 |
| 3,400,914 | 9/1968 | Benassi | 259/8 |
| 2,592,709 | 4/1952 | Kinnaird | 259/8 |
| 2,071,846 | 2/1937 | Lamb | 259/180 |

*Primary Examiner*—Robert W. Jenkins
*Attorney*—Woodling, Krost, Granger and Rust

[57] ABSTRACT

A foundry mixing machine is disclosed for mixing a mold material component with a binder component comprising a rotating rotor means to mix the components by action of centrifugal force. The invention is suitable for use with multi-component binders being able to mix two of the three components by a first mixing means and to mix the remaining component with the mixed components by a second mixing means. The foregoing abstract is merely a resume of one general application, is not a complete discussion of all principles of operation or applications, and is not to be construed as a limitation of the scope of the claimed subject matter.

36 Claims, 6 Drawing Figures

INVENTOR.
EDWARD J. REBISH

INVENTOR.
EDWARD J. REBISH
BY Woodling, Krost,
Granger and Rust
ATTORNEYS

INVENTOR
EDWARD J. REBISH

INVENTOR
EDWARD J. REBISH

FOUNDRY MIXING MACHINE

BACKGROUND OF THE INVENTION

This invention relates to mixing machines and more particularly to foundry mixing machines for mixing a mold material component and a binder component.

The prior art foundry mixing machines can be generally divided into two types. The first type of mixing machine included machines having an internal impeller or an internal mixing blade to mix a mold material component with a binder component. This type of mixer worked satisfactorily but would experience clogging after a period of use. A substantial amount of mold material component was also wasted at the beginning and end of each mixing cycle. In addition, the cleaning of the machine after completion of a mixing cycle was a difficult task. The mixed mold material and binder component within the machine was constantly deteriorating causing non-uniformity in material output due to delays and the like. A further disadvantage of this type of machine was the wear suffered by the impellers and other internal moving parts due to the abrasive quality of mold material.

A second type of prior art mixing machine included those generally classified as a centrifugal force mixing machine. In these machines, the material component would fall in proximity to a rotating disc which dispersed the coating component therefrom. However, this type of mixing machine did not offer a complete mixing due to the fact that large droplets of the coating component would be dispersed by the rotating disc causing portions of the material component to be saturated and leaving other portions of the material component unmixed. In addition, these machines were unable to function with the large variety of mold material components and binder components required by many foundries. Therefore, these machines never found an application in the foundry industry but were restricted to merely coating processes.

The difficulties of the prior art foundry mixing machines became more acute with the introduction of a multicomponent binder into the foundry industry. The first type of mixing machine had to be modified to include three impellers. Two of the impellers were used to mix each of the binder components with a portion of the mold material component and the third impeller was used to mix the two binder components. This increased the cost and complexity of these machines and the problem of clogging in the third impeller was still present. For some of the rapidly curing multicomponent binders, the impeller type mixing machine was completely impractical since the machine could not mix the binder components rapidly enough to avoid the binder curing within the machine.

The use of the multicomponent binder was also inapplicable to the prior art centrifugal force mixing machines. Generally, these centrifugal mixing machines dispersed the coating components in large droplets and did not afford proper mixing to the components. The mixing process was further complicated by the fact that material component was not freely falling during the entire mixing process. This caused the material component to be closely packed which resisted penetration by the coating component. Thus, the centrifugal force mixing machines were still inapplicable to a foundry mixing process.

Therefore, an object of this invention is to produce a foundry machine for mixing a mold material component and a binder component which uses centrifugal force as a method of mixing and can disperse the binder component into a fine dispersion to insure proper mixing.

Another object of this invention is to produce a foundry machine for mixing a mold material component and a binder component which is easy to use, requires only infrequent cleaning and can be easily cleaned.

Another object of this invention is to produce a foundry machine for mixing a mold material component and a binder component which is capable of having a two-stage mixing process.

Another object of this invention is to produce a foundry machine for mixing a mold material component and a binder component which is inexpensive.

Another object of this invention is to produce a foundry machine for mixing a mold material component and a binder component which has little or no waste at the beginning and end of each mixing cycle.

Another object of this invention is to produce a foundry machine for mixing a mold material component and a binder component which is capable of accommodating a variety of mold material components and binder components.

SUMMARY OF THE INVENTION

The invention may be incorporated in a foundry machine for mixing a mold material component and a binder having a first and a second component, comprising in combination, discharge means for the mold material component, first mixer means to mix two of the components, second mixer means to mix a third component with the aforementioned two components, rotatable rotor means, said second mixer means including director means directing the mold material emanating from said discharge means to substantially envelop said rotor means, and said first mixer means including said rotor means and means directing the first and second binder components to said rotor means to be dispersed thereby.

Other objects and a fuller understanding of the invention may be had by referring to the following description and claims, taken in conjunction with the accompanying drawing.

DESCRIPTION OF THE PREFERRED EMBODIMENT

Figure 1:
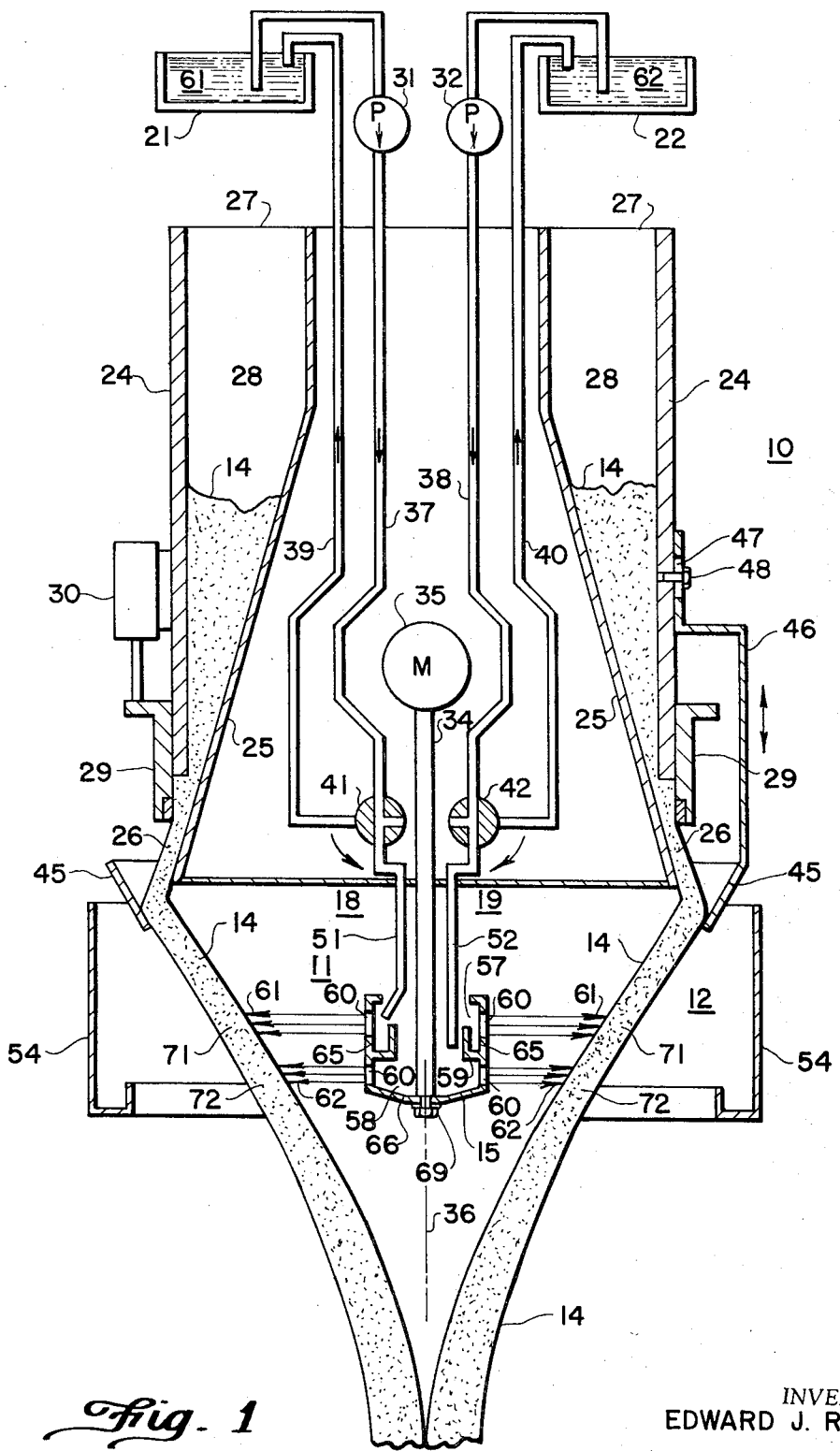
FIG. 1 is a simplified embodiment of the present invention showing a vertical sectional view of a foundry machine for mixing a mold material component and a binder component.

FIG. 1 shows a simplified embodiment of a foundry machine for mixing a mold material component and a first and a second binder component 61 and 62, respectively, which includes a discharge means shown generally as 10 for the mold material component 14, a first mixer means 11 to mix two of the components and a second mixer means 12 to mix a third component with the aforementioned two components. The discharge means 10 includes a housing 24 and a surface 25 established relative to the housing 24 to form a channel 28 therebetween. FIG. 1 shows the channel 28 being half occupied by the mold material component 14. The mold material component 14 is shown as sand but can be any material suitable for molds or cores in a foundry process. The channel 28 also includes a discharge opening 26 for the discharge of the mold material component 14. A loading opening 27 is established on one end of the generally vertical channel 28 for loading the mold material component 14 into the discharge means 10. The discharge opening 26 is shown to be substantially annular about an axis of symmetry 36 of the housing 24 and includes gate means 29 to open and close the discharge opening 26. An actuator 30 fixed to the housing 24 moves the gate means 29 to close or open the discharge opening 26 upon the command of an operator.

The first mixer means 11 includes a rotor means 15 which is mounted below the discharge means 10 on a substantially vertical shaft 34 and rotated by motor means 35. The first mixer means 11 also includes means 18, 19 directing the first and second binder components 61, 62 to said rotor means 15 to be dispersed thereby. The directing means 18, 19 include a first and a second reservoir 21 and 22 which are interconnected by conduits or connector means 37, 38, 39 and 40 with a first and a second pumping means 31 and 32 and a first and a second valve means 41 and 42 for the first and second binder components 61 and 62, respectively. Each of the valve means 41 and 42 has an actuated and an unactuated position. The valve means 41 and 42 are shown as three way valve means in the actuated position. First and second component tubes 51 and 52 direct the first and second binder components 61 and 62 to the rotor means 15.

The second mixer means 12 includes a director means 45 directing the mold material component 14 emanating from the discharge means 10 to substantially envelop the rotor means 15. The director means 45 directs the mold material component 14 which is shown falling from the discharge openings 26 by action of gravity to pass in proximity to the rotor means 15 to be mixed with the binder components dispersed by the rotor means 15. The fall of the mold material component 14 is not restricted by sliding on any adjacent surface. Thus, the mold material component is freely falling by action of gravity. The prior art mixing machines generally had the material component sliding down an inclined surface during the mixing process. This caused packing of the material component which inhibited coating component penetration and mixing. This also caused turbulent flow and material build up of the material component on the inclined surface. The director means 45 also directs the mold material component 14 to converge after passing the rotor means 15.

The director means 45 is attached to a bracket 46 having a slot 47 and secured to the housing 24 by a bolt 48. The slot 47 in the bracket 46 allows a vertical movement, as shown by the arrow in FIG. 1 of the director means 45, to vary the convergence of the mold material component 14. A shield 54 prevents any of the dispersed binder components from the rotor means 15 from emanating outside the immediate area of the foundry mixing machine.

The disclosed invention shown in FIG. 1 operates in the following manner. The first and the second binder components 61 and 62 of a multi-component binder are stored in the first and second reservoirs 21 and 22, respectively. The mold material component 14 is loaded into the channel 28 of the discharge means 10 through the loading opening 27. This loading process can either be a continuous process or the channel 28 can be of a size large enough to hold a sufficient amount of mold material component 14 for a given mixing application. The gate means 29 can be kept in a closed position by the actuator 30 to allow the mold material component 14 to be loaded. The first and second valve means 41 and 42 are set in the unactuated position by rotating the valve means 90° in the direction of the adjacent respective arrows. When the first and second pumping means 31 and 32 are energized, the first pumping means 31 circulates the first binder component 61 from the reservoir 21 by connector means 37 to the first valve means 41 and back through the connector means 39 to the first reservoir 21. The second binder component 62 is pumped from the second reservoir 22 by the second pumping means 32 through connector means 38 to the valve means 42 and returns to the second reservoir 22 by connector means 40. This circulation insures that a fresh supply of binder component under pressure is available at the first and second valve means 41 and 42 at any given time. This circulation also prevents any premature curing which might take place within the connector means, pumping means or valve means. When the motor means 35 is energized, the shaft 34 and the rotor means 15 rotate at a very high speed. Typically this rotation can be between 5,000 RPM and 15,000 RPM. When the rotor means 15 has achieved a suitable revolution rate, the first and second valve means 41 and 42 are rotated into the actuated position, as shown, by an operator. This allows the first and second pumping means 31 and 32 to pump the first and second binder components 61 and 62 from the first and second reservoirs 21 and 22 through the first and second component tubes 51 and 52, respectively, into the rotating rotor means 15.

The rotor means 15 includes a first rotor surface means 65 having rotor opening means 60 therein. The rotor opening means 60 have a substantial vectorial dimensional component parallel to the axis 36. The rotor opening means 60 are shown as vertical slots having a long length relative to the width thereof. However, the rotor opening means 60 could be a series of small openings which in combination produce an opening having a substantial vectorial component parallel to the axis 36 of rotation of the rotor means 15. The rotor means 15 also includes a second rotor surface means 66 having a substantial vectorial component normal to the axis 36. The rotor means 15 in FIG. 1 is shown as a container in which the first rotor surface means 65 is the side of the container and the second rotor surface means 66 is the bottom of the container.

The rotating rotor means 15 is shown as a two-level rotor means having an upper level 57 and a lower level 58 separated by a separator 59 and secured to the shaft 34 by a nut 69. The rotor means is removable to aid in cleaning and to install rotor means of different design as illustrated in FIGS. 2, 3, 5 and 6. The separator 59 is also a rotor surface having a substantial vectorial component normal to the axis of shaft 34, and as such is part of the second rotor surface means 66. The first binder component 61 is directed from the first component tube 51 into the upper level 57 whereas the second binder component 62 is directed from the second component tube 52 into the lower level 58. The rotation of the rotor means 15 creates a centrifugal force to move the first and second binder components 61 and 62 (which are) on the first rotor surface means 65 to a majority of the area of the rotor opening means 60. The binder components cover a majority of the area of the rotor opening means 60 and are thrown out by the action of centrifugal force. Thus, the rotation of the rotor means 15 forces the first and second binder components 61 and 62 through the rotor opening means 60 to be dispersed or atomized in proximity to the rotor means 15. The first binder component 61 is dispersed as shown by the arrows designated 61, whereas the second binder component 62 is dispersed as shown by the arrows designated 62. When the atomization process by the rotor means 15 is established, the operator opens the gate means 29 to establish the flow of the mold material component 14 directed by the director means 45 to pass in proximity to the rotating rotor means 15. As the mold material component 14 passes the rotor means 15, the first mixing means 11 mixes the first binder component 61 with the mold material component 14 at an area designated 71 and as the mold material component 14 continues to fall, the second mixing means 12 mixes the mixture of the mold material component 14 and the first binder component 61 with the second binder component 62 at an area designated 72. The process of mixing by the first and second mixing means 11 and 12 at areas 71 and 72, respectively, takes place when the mold material component is in a freely falling condition. This allows a greater binder penetration through the falling material and produces a more complete mixing. In this embodiment, the first and second binder components 61 and 62 are not directly mixed with each other prior to mixing with the mold material component 14 but the mold material component 14 is mixed with the first binder component 61 and is subsequently mixed with the second binder component 62. For example, the first binder component 61 can be a resin which is mixed with the mold material component 14, and the second binder component 62 can be a catalyst which is mixed with the mixture of the resin and the mold material component 14 to avoid premature curing of the three component mixture. The foregoing mixing process can be a completely automatic process requiring an operator to only start and stop the machine.

Figure 2:
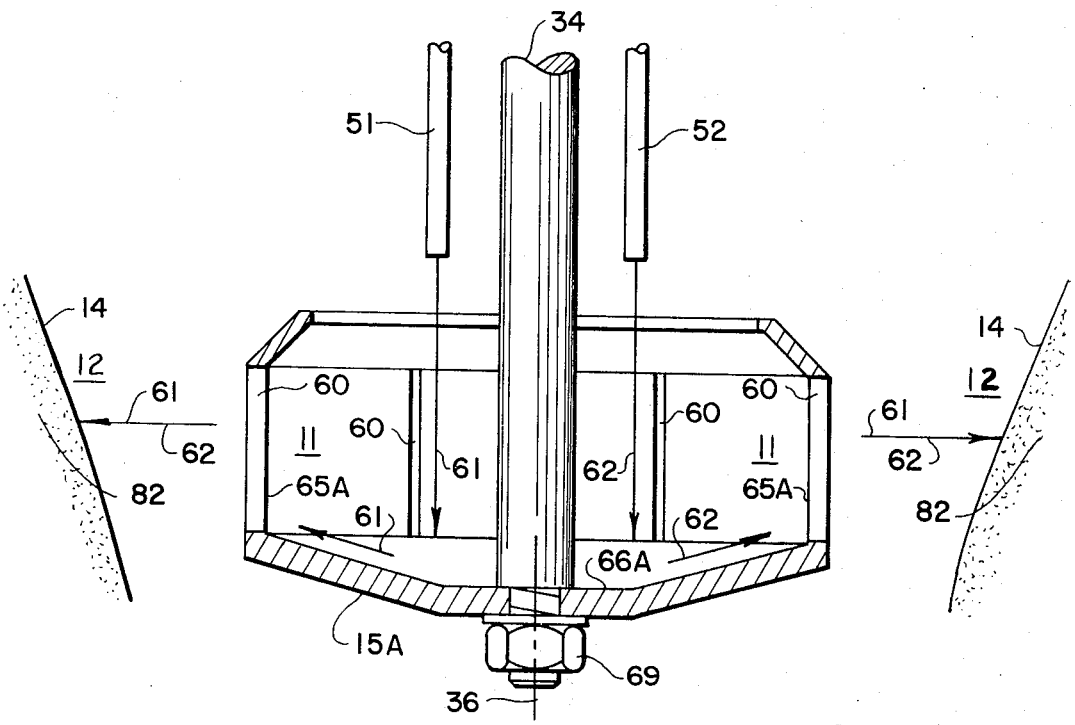
FIG. 2 is a vertical sectional view of a variation of the rotor means which is compatible for use with the invention shown in FIGS. 1 and 4.
Figure 3:
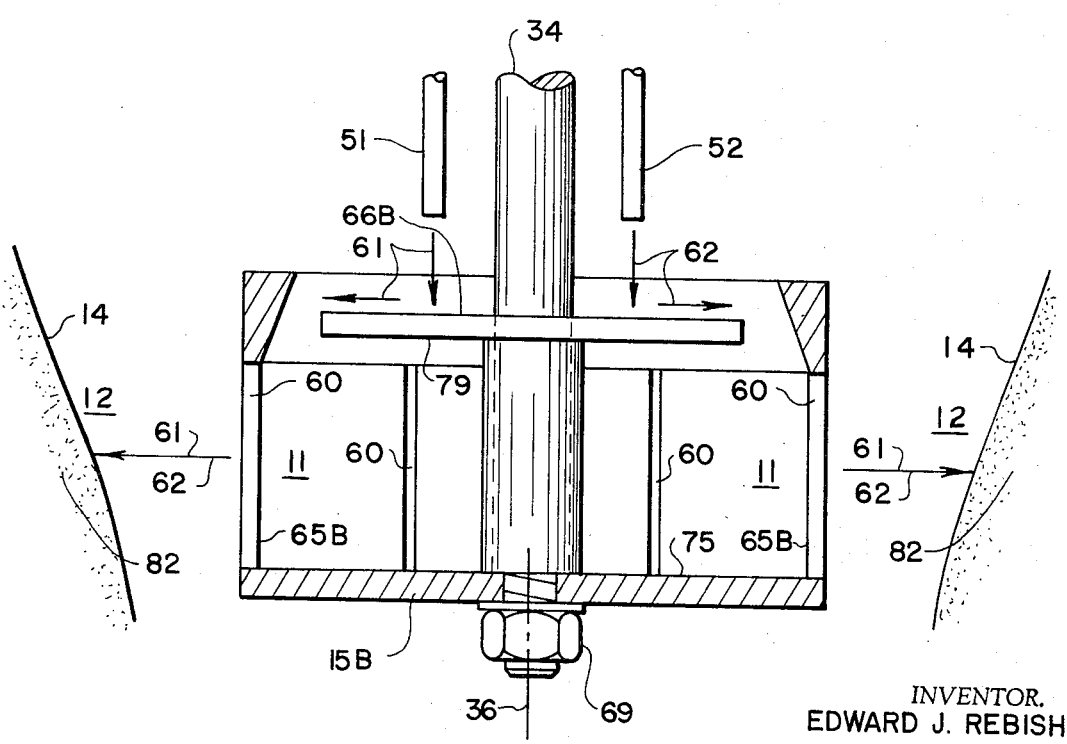
FIG. 3 is a vertical sectional view of still an additional variation of the rotor means which is compatible for use with the invention shown in FIGS. 1 and 4.

FIGS. 2, 3, 5 and 6 show modified versions of the rotor means 15 which are compatible for use with the invention shown in FIG. 1. The rotor means in FIGS. 1 and 4 can be removed by removal of the nut 69 and either of the rotor means 15A or 15B, 15C, 15D and 15E can be installed. FIGS. 2 and 3 illustrate the first and second component tubes 51 and 52 and a portion of the mold material component 14 which is falling in proximity to the rotating rotor means 15. Each of the rotor means in FIGS. 2 and 3 has a first rotor surface means 65, designated 65A and 65B, and a second rotor surface means 66, designated 66A and 66B, respectively. The second rotor surface means 66A in FIG. 2 is shown as the bottom of a container with the first rotor surface means 65A being the side of the container. The second rotor surface means 66B in FIG. 3 includes a member 79 located near the top of the rotor means 15B to which the first and second binder components 61 and 62 are directed.

FIGS. 2 and 3 illustrate means directing the first and second binder components 61 and 62 to the first rotor surface means 65A or 65B. This means includes directing the first and second binder components 61 and 62 to the second rotor surface means 66A or B to be moved by action of the rotating rotor means 15 to the first rotor surface means 65. Thus, in FIGS. 2 and 3, the first and second binder components 61 and 62 will drop to the second rotor surface means 66A or B to be moved by action of the rotating rotor means 15A or B to cover the first rotor surface means 65A or B and a majority of the area of the rotor opening means 60.

The means directing the binder components 61 and 62 to the first rotor surface means 65 also includes directing the first and second binder components 61 and 62 by the first and second tubes 51 and 52 to drop or flow directly onto the first rotor surface means 65A or B. In such a case, the bottom of the container can be effectively eliminated to neutralize any updraft created by air filling into the rotor means 15. Such an updraft is caused by a partial vacuum created within the rotor means 15 due to the dispersion of the atmosphere therein through the rotor opening means 60.

In the embodiments shown in FIGS. 2 and 3, the first mixer means 11 mixes the first binder component 61 with the second binder component 62 within the rotor means 15. The mixture of the first and second binder components 61 and 62 is then dispersed through the rotor opening means 60 for further mixing of the two dispersions wherein the second mixer means 12 mixes the mold material component 14 with the mixed binder components 61 and 62 at area designated 82.

In the embodiment shown in FIG. 1, the first mixer means 11 mixes the first binder components 61 with the mold material component 14 and the second mixer means 12 mixes the mixture of the first binder component 61 and the mold material component 14 with the second binder component 62. The installation of a rotor means illustrated in FIGS. 2, 3, 4 and 5 will transform FIG. 1 such that the first mixer means 11 will mix the first and second binder components 61 and 62 and the second mixer means 12 will mix the mixture of the binder components with the mold material component 14. In addition to these two combinations of the first and second mixer means 11 and 12, a third combination is possible wherein the first and second binder components 61 and 62 are dispersed separately as shown in FIG. 1 but mixed with one another in close proximity to the rotor means 15 and proceed to be dispersed as a mixture to mix with the mold material component 14. Each of these methods of mixing are useful to accommodate for differences in the physical characteristics of the mold material components and the binder components. Each of these methods of mixing is included within the scope of this invention.

The rotor opening means 60 can be small perforations or slots as shown in FIG. 1, to increase the vertical dispersion of the first and second component binders 61 and 62. The slots may be very thin, for example, 0.005 inches, up to 0.250 inches in thickness and having a length commensurate with the sides of the rotor means 15. The slots in the rotor means 15 can be substantially vertical or can be at an angle with respect to the rotating axis 36 depending upon the specific application and materials used. In most applications, a plurality of slots will be present in the rotor means 15 to insure that the binder components are properly dispersed into a fine dispersion to produce complete mixing. The movement of the director means 45 enables the operator to somewhat vary the convergence or pattern of the falling mold material component 14 after passing by the rotor means 15. This enables the operator to directly fill a mold or core box after passing by the rotor means 15 without being directed by a funnel or an additional deflection plate. The additional deflection plate also prevents the falling material from being in a true free falling condition. The free falling condition is desirable since the amount of the falling material per unit air space in proximity to the rotor means 15 is reduced allowing a more complete penetration and mixing by the binder components. This also eliminates the problem of clogging in funnels directing mold material after the mold material has been saturated with a binder. The shield 54 prevents the dispersion of the first and second binder components into the immediate atmosphere when there is no flow of the mold material component 14. The shield 54 does not support the mold material component 14 during the mixing process.

Figure 4:
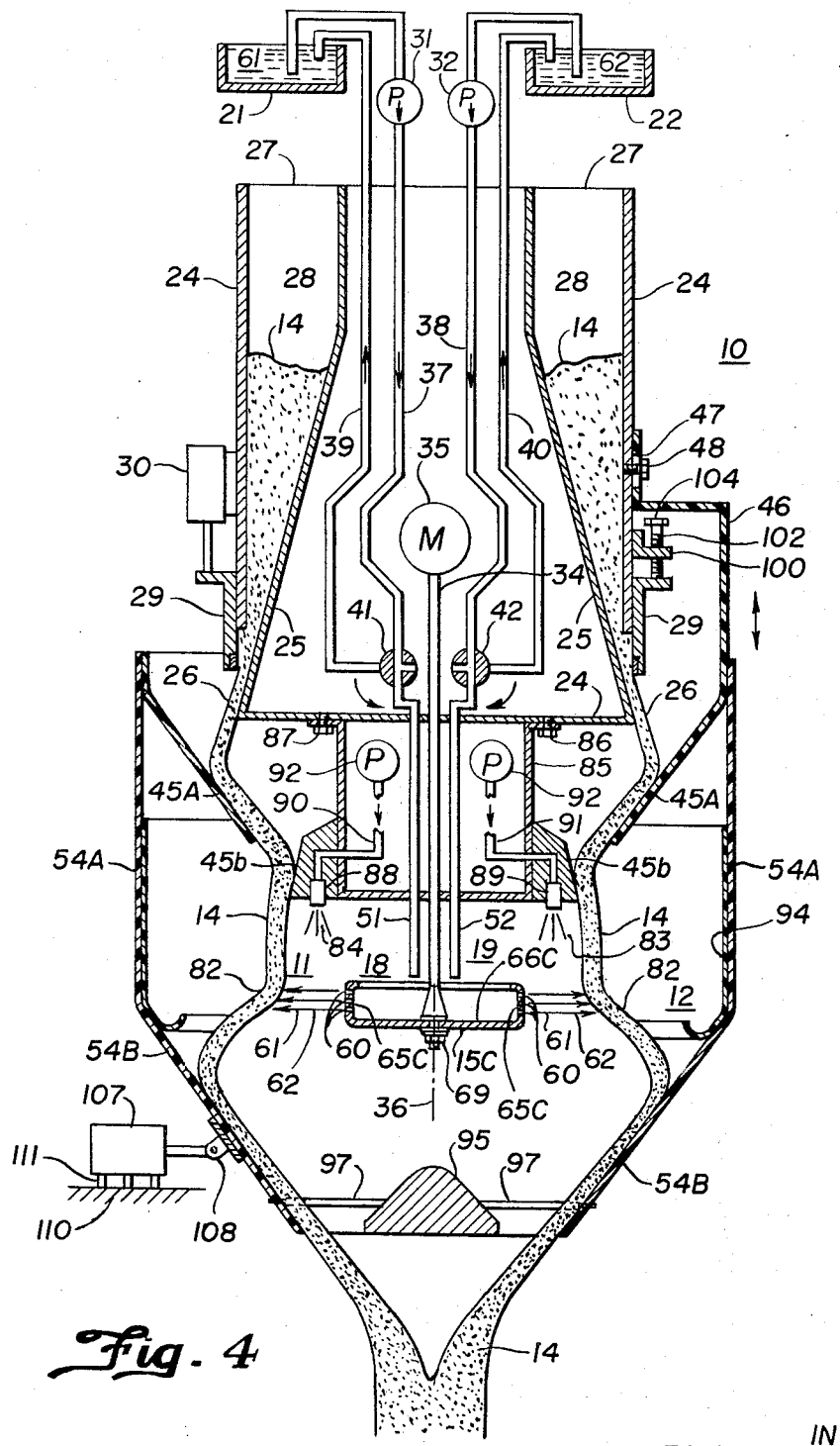
FIG. 4 is the preferred embodiment of the present invention showing a vertical sectional view of a foundry machine.

The preferred embodiment FIG. 4 illustrates a foundry machine for mixing the mold material component 14 and the first and second binder components 61 and 62, respectively, which is a more refined version of the foundry machine shown in FIG. 1. The discharge means 10 of the foundry machine shown in FIG. 4 is substantially identical to the discharge means 10 shown in FIG. 1 comprising the housing 24, the surface 25, the discharge opening 26 and the gate means 29. The actuator 30 lifts the gate means 29 in a manner similar to that shown in FIG. 1. The foundry machine shown in FIG. 4 includes a support 100 mounted to the housing 24 having a screw 102 which is adjustable by a hand adjustment 104. The screw 102 adjusts the maximum travel of the gate means 29 to vary the size of the discharge opening 26.

A second housing 85 is attached by bolts 86 and 87 to the discharge means 10. The housing 85 includes air valves 88 and 89 which are connected by the tubes 90 and 91 to an air compressor pump 92. The air compressor pump 92 is shown for the sake of simplicity to be within the housing 85 but typically would be found without the housings 24 and 85 of the foundry machine. The tubes 90 and 91 can be established between the channel 28 as the conduit tubes 37–40.

The foundry machine shown in FIG. 4 also includes director means which comprises first director means 45A and a second director means 45B. The first director means 45A directs the falling mold material component 14 to converge towards the axis of symmetry 36 whereas the second director means 45B causes the mold material component to slightly diverge from the axis of symmetry 36 to be free-falling in a substantially vertical direction at mixing points 82. The first director means 45A forms an angle relative to the axis 36 having a value between 20° and 60° whereas the second director means 45B forms an angle relative to axis 36 having a value between 5° and 15°. Experiments by the inventor indicate that 40° and 10° for the first and second director means 45A and 45B, respectively, are the optimum for most mold material components. Rotor means having diameters between 2.0 and 6.0 inches, having a surface speed within a range of 3000 to 16,000 feet per minute have been found to be effective.

A shield 54A is attached to the director means 45A and includes a third director means 54B to direct the mold material component 14 to converge to the axis of symmetry 36. An exit cone 95 is suspended by a support 92 which is attached to the third director means 54B to produce an annular opening at the base of the third director means 54B. A vibrating means 107 is connected by connectors 111 to a support 110 which is fixed relative to the housing 24. The vibrating means is attached to a connector 108 to vibrate the third director means 54B.

The rotor means 15C is attached to the shaft 34 by the nut 69. The rotor means 15C includes a first rotor surface means 65C and a second rotor surface means 66C. The first rotor surface means 65C contains rotor opening means 60 which are shown as a series of holes in the first rotor surface means 65C having a substantial vectorial component parallel to the axis 36. The first and second binder components 61 and 62, respectively, are mixed by the first mixer means 11 in the rotor means 15C and are dispersed through the rotor opening means 60 to mix with the mold material component 14 at mixing points 82. The operation of the rotor means 15C is similar to the operation of the structure shown in FIG. 2. However, any of the rotor means illustrated in FIGS. 1–3 are compatible with the invention shown in FIG. 4.

The preferred embodiment shown in FIG. 4 has many advantages over the simplified embodiment shown in FIG. 1. The preferred embodiment is able to accommodate a wide range of materials used by a foundry in a mold or core making process. For an example, viscosity ranges of binder components between 0.8 and 6.0 on the stokes scale can be encountered. In addition, a wide range in particle size of the mold material component 14 can be used with the invention shown in FIG. 4.

FIG. 4 illustrates the mixing of a first and second binder component 61 and 62 with a mold material component 14 which has a very fine particle size. The fact that the mold material component 14 has a fine particle size is emphasized by the fact that the stream of falling mold material component diverges at points 82 due to the first and second binder components 61 and 62 striking the falling mold material component 14. The mixing of a mold material component 14 having a small particle size requires the third director means 54B to direct the falling mold material component to converge towards the axis of symmetry 36. However, the mixing is accomplished when the mold material component 14 is freely falling. The exit cone 95 prevents any of the mold material component 14 which has not been coated with the binder components 61 and 62 to exit without being within the stream of mold material component 14. Any particles that remain uncoated will strike the exit cone 95 and will fall into the stream of mold material component 14 and will be mixed thereby. The shield 54A and the third director means 54B in addition to the exit cone 95 can be made of or coated with a smooth surface to inhibit the mixed mold material component 14 and the first and second binder components 61 and 62 from sticking thereon. This can also be accomplished by covering these surfaces 54A, 54B and 95 with a disposable liner. The shield 54A is shown covered with a disposable liner 94 to allow rapid cleaning. The vibrating means 107 causes vibration of the third director means 54B to inhibit the mixed mold material and binder components from sticking to the third director means 54B.

The air jets 83 and 84 aid in insuring a uniform mixing of the components during the initial and final stages of a given mixing process. For example, assume that the gate means 29 is closed, the rotor means 15C is rotating and the first and second binder components 61 and 62 are being pumped into the rotor means 15C. Prior to opening the gate means 29, air jets controlled by the air jets 88 and 89 are energized for a duration between a fraction of a second and several seconds creating a partial vacuum in proximity to the rotor means 15C. As the gate means 29 is opened by the actuator 30, the flow of mold material component 14 does not start immediately but starts as a small amount and increases in flow rate into a stream in accordance with the manner in which the gate means 29 opens the discharge openings 26. During the period of time when a small amount of mold material component 14 is falling, the air jets 83 and 84 cause the mold material components 14 to fall near the rotor means 15C as the established streams shown in FIG. 4. This partial vaccum is sustained after the stream of mold material component is established by action of the rotor means 15C. Upon closing the discharge opening means with the gate means 29, the stream of mold material component will again be reduced. The air jets 83 and 84 will be again energized to maintain the partial vacuum causing the substantially reduced stream to be mixed in a manner similar to the established stream. Thus the air jets 83 and 84 insure that the initial and final flow of mold material component 14 will be mixed as uniformly as the intermediate flow.

Figure 5:
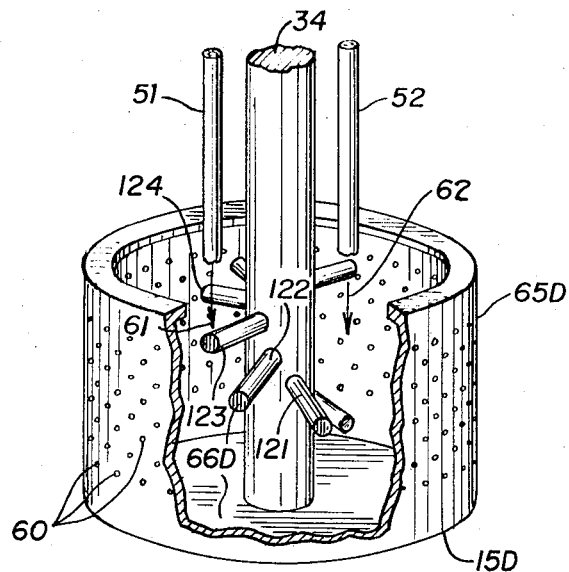
FIG. 5 is an isometric view of a variation of the rotor means usable with the invention shown in FIGS. 1 and 4; and, FIG. 6 is an isometric view of a variation of the rotor means which is compatible with the invention shown in FIGS. 1 and 4.

FIG. 5 illustrates a rotor means 15D connected to the shaft 34 which is compatible with the foundry machines illustrated in FIGS. 1 and 4. Rotor means 15D includes a first rotor surface means 65D and a second rotor surface means 66D. The first rotor surface means 65D includes rotor opening means 60 illustrated as holes drilled in the first rotor surface means 65D. These holes could typically be from 0.010 to 0.060 inches in diameter and spaced from one another by 1° to 6°.

The second rotor surface means 66D includes the bottom surface of the rotor means and the plurality of protrusions 121–124 extending perpendicularly from the axis of rotation which is the shaft 34. The protrusions 121–124 distribute the first and second binder component 61 and 62 emanating from the first and second component tubes 51 and 52, respectively, over the entire first rotor surface means 65D to produce a uniform vertical dispersion.

Figure 6:
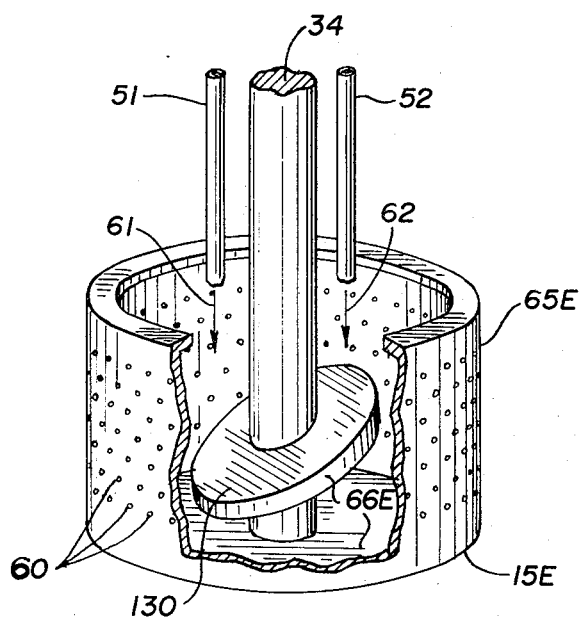

FIG. 6 illustrates a rotor means 15E which is similar in construction to the rotor means shown in FIG. 5. The rotor means 15E includes a first rotor surface means 65E and a second rotor surface means 66E. The first rotor surface means 65E includes rotor opening means 60 and the second rotor surface means 66E includes the bottom of the rotor means 15E and an inner rotor projection 130. The inner rotor surface projection 130 forms an acute angle with the axis of rotation and rotates with shaft 34 to aid in distributing the first and second binder components 61 and 62 uniformly over the first rotor surface means 65E. The rotor means 15D and 15E illustrated in FIGS. 5 and 6 are compatible with the foundry machines illustrated in FIGS. 1 and 4.

The preferred embodiment FIG. 4 illustrates a foundry mixing machine capable of handling a wide variety of mold material components and binder components. The second housing 85 effectively creates a smaller annular opening between the director means 45A and 45B to produce a falling curtain of mold material component 14 of a given thickness with a substantially reduced flow rate. The amount of mold material component 14 which is flowing per unit time at a given curtain thickness is a function of the radius of the curtain from the axis 36. The director means 45A and 45B substantially reduce the diameter of the falling mold material component 14 to accommodate for lower flow rates of mold material component 14. In addition the third director means 54B converges the mold material component such that it can be poured directly into a mold or a core box.

Experiments by the inventor have demonstrated that the mixture of mold material component 14 and binder components 61 and 62 has a greater fluffiness than a similar mixture achieved by the prior art mixing processes. Mold material and binder components mixed by the disclosed invention have as much as 18 percent lower weight per unit volume than similar materials mixed by the prior art processes. The lower density allows an easier flow of the mixture and enables more exact mold and core forms to be made. The mixing process disclosed in this invention does not damage the mold material component by grinding and breaking the material as commonly experienced in the prior art processes incorporating internal impellers and the like. Accordingly, the mold material component can be reused by burning off the binder components producing a more economical foundry process. Finally, experiments by the inventor indicate that the foundry mixing machines illustrated in FIGS. 1 and 4 do not discriminate between small and large particles of mold material component as was found in the prior art machines. This disadvantage of the prior art machines produced variations in strength of the molds and cores which could cause defective castings resulting in severe economic losses.

In a foundry core or mold-making process wherein the products of the foundry require a limited selection of mold material and binder components, the invention shown in FIG. 1 is suitable for such applications. However, in the foundry wherein a variety of mold material components are used having a wide variety of characteristics, the invention shown in FIG. 4 is more suitable for such application.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A foundry machine for mixing a mold material component and a binder having a first and a second component, comprising in combination,
   discharge means for the mold material component,
   first mixer means to mix two of the components,
   second mixer means to mix a third component with the aforementioned two components,
   rotatable rotor means,
   said second mixer means including director means directing the mold material emanating from said discharge means to substantially envelop said rotor means,
   and said first mixer means including said rotor means and means directing the first and second binder components to said rotor means to be dispersed thereby.

2. A foundry machine as set forth in claim 1, wherein said discharge means includes;
   a housing,
   a surface established relative to said housing forming a channel therebetween,
   and said channel having a discharge opening for the discharge of the mold material component.

3. A foundry machine as set forth in claim 2, wherein said channel includes a loading opening for loading the mold material component.

4. A foundry machine as set forth in claim 2, including gate means for said discharge opening to open and close said opening.

5. A foundry machine as set forth in claim 2, wherein said channel is generally vertical,
   and said discharge opening is substantially annular.

6. A foundry machine as set forth in claim 1, wherein said rotor means is mounted below said discharge means on a substantially vertical shaft and rotated by motor means.

7. A foundry machine as set forth in claim 6, wherein said director means includes first and second director means,
   said first director means converging the mold material component and forming an angle relative to said vertical shaft having a value between 20 and 60°,
   and said second director means diverging the mold material component and forming an angle relative to said vertical shaft having a value between 5° and 15°.

8. A foundry machine as set forth in claim 1, wherein said rotor means has a bottom and sides and rotor opening means therein.

9. A foundry machine as set forth in claim 8, wherein said rotor opening means includes a slot opening in the side of said rotor means.

10. A foundry machine as set forth in claim 8, wherein said rotor means is symmetrical about an axis of rotation.

11. A foundry machine as set forth in claim 8, wherein the rotation of said rotor means causes the first and second binder components and the atmosphere within said rotor means to be forced through said rotor opening means by action of centrifugal force to create dispersion of said first and second binder components in proximity to said rotor means to enable mixing with the mold material component by said second mixer means.

12. A foundry machine as set forth in claim 1, wherein said first mixer means mixes the first and second binder components and said second mixer means mixes the mold material component with the mixed binder components.

13. A foundry machine as set forth in claim 1, wherein said first mixer means mixes the first binder component with the mold material component and said second mixer means mixes the second binder component with the mixed first component and the mold material component.

14. A foundry machine as set forth in claim 1, wherein said means directing the first and second binder components to said rotor means includes;
   a first and a second reservoir,
   first and second pumping means,
   first and second valve means,
   and connector means interconnecting said first and second reservoirs, said first and second pumping means and said first and second valve means for said first and second binder components, respectively.

15. A foundry machine as set forth in claim 14, wherein each of said valve means has an actuated and an unactuated position and said first and second pumping means circulates the first and second binder components between said first and second valve means and said first and second reservoirs, respectively, when said valve means are in the unactuated position and said first and second pumping means pumps the first and second binder components, respectively, to said rotor means when said first and second valve means are in the actuated position.

16. A foundry machine as set forth in claim 1, wherein said director means includes directing the mold material component emanating from said discharge means to pass in proximity to said rotor means to be mixed with the binder components dispersed by said rotor means.

17. A foundry machine as set forth in claim 16, wherein said director means includes directing the mold material component to converge after passing said rotor means.

18. A foundry machine as set forth in claim 1, wherein the mold material component emanating from said discharge means includes the mold material component falling by action of gravity.

19. A foundry machine as set forth in claim 1, wherein said director means includes a first and a second director means.

20. A foundry machine as set forth in claim 19, wherein said first director means directs the mold material component to converge and said second director means directs the mold material component to diverge relative to said rotor means.

21. A foundry machine as set forth in claim 20, including a third director means to converge the mold material component.

22. A foundry machine as set forth in claim 21, including vibrator means connected to said third deflector means to vibrate said third deflector means.

23. A foundry machine as set forth in claim 1, including air jet means establishing a partial vacuum in proximity to said rotor means to establish the mold material component to substantially envelop said rotor means.

24. A foundry machine for mixing a mold material component and a binder having a first and second component comprising in combination,
a housing for the mold material component,
a surface established relative to said housing forming a channel therebetween,
said channel having a discharge opening for the discharge of the mold material component,
first mixer means to mix two of the components,
second mixer means to mix a third component with the aforementioned two components,
rotatable rotor means,
director means,
said first mixer means including;
said rotor means mounted below said discharge opening on a substantially vertical shaft and rotated by motor means,
means directing the first and second binder components to said rotor means to be dispersed thereby,
and said second mixer means including said director means directing the mold material component falling from said discharge opening to substantially envelop said rotor means to be mixed with the binder components dispersed by said rotor means.

25. A foundry machine for mixing a mold material component and a binder having a first and second component, comprising in combination,
discharge means for the mold material component,
first mixer means to mix two of the components,
second mixer means to mix a third component with the aforementioned two components,
rotatable rotor means,
said second mixer means including director means directing the mold material component emanating from said discharge means to substantially envelop said rotor means,
said first mixer means including said rotor means and means directing the first and second binder components to said rotor means to be dispersed thereby,
said means directing the first and second binder components to said rotor means includes;
a first and a second reservoir interconnected with first and second pumping means a first and second valve means for said first and second binder components, respectively,
and said valve means each having an actuated and an unactuated position and said first and second pumping means circulates the first and second binder components between said first and second valve means and said first and second reservoirs, respectively, when said valve means are in the unactuated position and said first and second pumping means pumps the first and second binder components, respectively, to said rotor means when said first and second valve means are in the actuated position.

26. A foundry machine for mixing a mold material component and a binder having a first and second component comprising in combination,
a housing for the mold material component,
a surface established relative to said housing forming a generally vertical channel therebetween,
said channel having a loading opening and a substantially annular discharge opening for the loading and discharge of the mold material component, respectively,
gate means for said discharge opening to open and close said discharge opening,
first mixer means to mix two of the components,
second mixer means to mix a third component with the aforementioned two components,
rotatable rotor means,
director means,
said first mixer means including;
said rotor means mounted below said discharge opening on a substantially vertical shaft and rotated by motor means,
said rotor means having a bottom and sides with rotor opening means therein,
means directing the first and second binder components to said rotor means to be dispersed thereby,
said means directing the first and second binder components to said rotor means including;
a first and a second reservoir interconnected with first and second pumping means and first and second valve means for said first and second binder components, respectively,
said valve means each having an actuated and an unactuated position and said first and second pumping means circulates the first and second binder components between said first and second valve means and said first and second reservoirs, respectively, when said valve means are in the unactuated position and said first and second pumping means pumps the first and second binder components, respectively, to said rotor means when said first and second valve means are in the actuated position,
and said second mixer means including said director means directing the mold material component falling from said discharge opening to substantially envelop said rotor to be mixed with the binder components dispersed by said rotor means and to substantially converge after passing said rotor means.

27. A foundry machine for mixing a mold material component and a binder component, comprising in combination,
rotor means having an axis of rotation and a first rotor surface,
rotor opening means in said first rotor surface means having a substantial vectorial component parallel to said axis,
means directing the binder component to said first rotor surface means,
means rotating said rotor means to move the binder component which is on said first rotor surface means to a majority of the area of said rotor opening means and to force the binder component through said rotor opening means to form a dispersion,
and director means directing the mold material component to said dispersion to mix with the binder component.

28. A foundry machine as set forth in claim 27, wherein said axis is substantially vertical.

29. A foundry machine as set forth in claim 27, wherein said rotor opening means includes a slot having a long length relative to the width thereof.

30. A foundry machine as set forth in claim 27, wherein said means directing the binder component to said first rotor surface means includes,
a second rotor surface means having a substantial vectorial component normal to said axis, and means directing the binder component to said second rotor surface means to be moved by action of said rotating rotor means to said first rotor surface means.

31. A foundry machine as set forth in claim 30, wherein said first rotor surface means includes the side of a container and said second rotor surface means includes the bottom of said container.

32. A foundry machine as set forth in claim 30, wherein said second rotor surface means includes a plurality of projections extending perpendicularly from said axis of rotation.

33. A foundry machine as set forth in claim 32, wherein said projections project from different locations along said axis of rotation.

34. A foundry machine as set forth in claim 30, wherein said second rotor surface means includes an inner rotor projection surface forming an acute angle with said axis of rotation.

35. A foundry machine for mixing a mold material component and a binder component, comprising in combination, rotor means having a first rotor surface with rotor opening means therein, said rotor opening means having a major vectorial component parallel to the axis of rotation of said rotor means, means directing the binder component to said rotor means, director means directing the mold material component to substantially envelop said rotor means, and means rotating said rotor means to disperse the binder component through said rotor opening means to form a dispersion to enable mixing of the components only when the mold material component is freely falling by action of gravity.

36. A foundry machine as set forth in claim 35, wherein said director means includes director means directing the mold material component to converge after passing said rotor means.

* * * * *